Patented Aug. 6, 1935

2,010,012

UNITED STATES PATENT OFFICE 2,010,012

CHEMICAL PRODUCT AND PROCESS FOR PREPARING SAME

Arnold M. Collins, Wilmington, Del., assignor to E. I. du Pont de Nemours & Company, Wilmington, Del., a corporation of Delaware No Drawing. Application January 9, 1934, Serial No. 705,893

22 Claims. (Cl. 106—22)

This invention relates to new and useful compositions of matter. More particularly it relates to compositions containing mixtures of the addition product of monovinylacetylene and hydrochloric acid with various protein materials. Still more particularly it relates to the preparation of films, plastics, coating compositions, adhesives, etc., from aqueous dispersions of the polymerized addition product intermixed with aqueous dispersions of protein materials.

This application is a continuation in part of application, Serial No. 537,484, filed May 14, 1931.

This invention has as an object the preparation of new and useful compositions of matter. A further object is to prepare dispersions of chloro-2-butadiene-1,3 polymer containing substantial amounts of various protein materials. A still further object is to prepare useful articles from such dispersions.

It has been found that either acid or alkaline aqueous dispersions of polymerized chloro-2-butadiene-1,3 may be modified in properties by incorporating such protein materials as gelatin, glue, casein, etc., in the form of aqueous solutions or dispersions. The ratio of polymerized chloro-2-butadiene-1,3 to protein may be varied from one part polymerized chloro-2-butadiene-1,3 with nine parts protein to nine parts polymerized chloro-2-butadiene-1,3 with one part protein.

Aqueous alkaline dispersions of polymerized chloro-2-butadiene-1,3 which are described in the application, of which this application is a continuation in part, and aqueous acid dispersions of polymerized chloro-2-butadiene-1,3 which are described in an application of J. E. Kirby, Serial No. 572,739, filed Nov. 2, 1931, may be prepared as follows:

*Alkaline dispersion of polymerized chloro-2-butadiene-1,3*

Fresh chloro-2-butadiene-1,3 is added slowly and with vigorous mechanical agitation to an equal weight of a 2% aqueous solution of sodium oleate. When the emulsification has been completed, the emulsion is stored at 10° C. for twenty-four to forty-eight hours. During this period of storage the chloro-2-butadiene-1,3 undergoes polymerization and a dispersion of polymerized insoluble polymer results. Enough ammonia is added to render the dispersion slightly alkaline, after which it is ready for use. Antioxidants which have been previously dispersed in 2% aqueous sodium oleate solution may be incorporated at this point if desired. This incorporation is effected by mixing the antioxidant dispersion with the dispersion of polymerized chloro-2-butadiene-1,3. Phenyl-beta-naphthylamine is a suitable antioxidant for this purpose and may be incorporated to the extent of 1%, based on the weight of polymer in the emulsion.

*Acid dispersion of polymerized chloro-2-butadiene-1,3*

Two parts of casein are dissolved in 104 parts of glacial acetic acid and 260 parts of water. 92 parts of chloro-2-butadiene-1,3 are then dispersed in this solution in the same manner as in the sodium oleate solution used in the preceding example. In about two days, polymerization is complete and a latex, similar in appearance to that described above, results.

In combining aqueous dispersions of polymerized chloro-2-butadiene-1,3 with aqueous dispersions of protein materials, it is necessary that both dispersions be either alkaline or acid. Thus, an acid casein dispersion may be combined with an acid chloro-2-butadiene-1,3 polymer dispersion but an acid casein dispersion cannot be combined with an alkaline chloro-2-butadiene-1,3 polymer dispersion without causing coagulation of the polymer. When aqueous dispersions of polymerized chloro-2-butadiene-1,3, especially of the alkaline type, are mixed with aqueous dispersions of protein material, they give products which are useful for a variety of purposes, such as adhesives for safety glass inner layers, molding compositions, vehicles for cold water paints, sizing compositions for paper, etc. The preparation of these materials is illustrated in the following examples:

*Example 1*

16.6 parts of casein are added to 83.4 parts of water and the mixture is allowed to stand for two or three hours in order to effect a thorough soaking of the casein. The mixture is then warmed to 60–80° C. and ammonia water (specific gravity 0.90) is added in portions until a persistent ammoniacal odor is obtained. Swelling of the casein begins as soon as the ammonia is added. This swelling is hastened by stirring. In case unswollen lumps persist after stirring, more ammonia is added. Finally, a smooth milky dispersion is obtained which is allowed to age for twenty-four hours before use.

100 parts of the above casein dispersion is added with constant stirring to 106 parts of a 47% aqueous alkaline dispersion of polymerized chloro-2-butadiene-1,3 containing 5 cc. of ammonia water (specific gravity 0.90). The mixture sometimes tends to solidify after the first addition of casein but as more casein is added, a drop in viscosity occurs and a smooth dispersion is finally obtained. This dispersion is allowed to age for twenty-four hours before use in order to eliminate any undispersed particles that may be present. The final dispersion contains chloro-2-butadiene-1,3 polymer and casein in the ratio of 3:1 and has a total solids content of 32.2%.

*Example 2*

25 parts of casein is kneaded with 75 parts of glacial acetic acid until the casein is well dispersed. The resulting jelly is then diluted with water until a solids content of 14.5% is reached.

50 parts of the above casein dispersion is added with constant stirring to 22.7 parts of a 20% acid aqueous dispersion of chloro-2-butadiene-1,3 polymer, prepared as previously described. The resulting dispersion is allowed to stand for twenty-four hours before use. This dispersion contains casein and chloro-2-butadiene-1,3 polymer in the ratio of 1.6:1.

*Example 3*

4 parts of gelatin, preferably in powdered form and substantially free from inorganic salts, is added to 96 parts of water at a temperature of 60-80° C. The resulting mixture is stirred until the gelatin is completely dissolved.

100 parts of the above gelatin solution containing 5 cc. of ammonia water (specific gravity 0.90) and 0.5 parts trisodium phosphate is added with constant stirring to 25.5 parts of a 47% aqueous alkaline dispersion of chloro-2-butadiene-1,3 polymer containing 2 cc. of ammonia water (specific gravity 0.90). The mixture is allowed to age for twenty-four hours to remove any incompletely dispersed particles. This composition contains gelatin and chloro-2-butadiene-1,3 polymer in the ratio of 1:3 and has a solids content of 12.7%.

Glue may be substituted for gelatin in Example 3, or may be incorporated as described in the following example.

*Example 4*

A solution of glue in water is made slightly alkaline with ammonium hydroxide and enough of this solution is added to a standard polymerized latex to provide one part of glue for each four parts of chloro-2-butadiene-1,3. To the resulting homogeneous emulsion a small amount of a colloidal solution of phenyl-beta-naphthyl-amine is added. The latex thus produced yields a stiff film very resistant to tear.

The following example illustrates the preparation of a safety glass sandwich using a gelatin-chloro-2-butadiene-1,3 polymer composition.

*Example 5*

Two glass plates of any suitable size or thickness are thoroughly cleansed on one side with soap solution or other suitable composition which will remove dirt or grease. The clean surfaces are then coated by any suitable means, for example, by spraying with an aqueous alkaline dispersion of gelatin and chloro-2-butadiene-1,3 polymer having the following composition:

| | Parts |
|---|---|
| Gelatin | 1 |
| Chloro-2-butadiene-1,3 polymer | 2 |
| Water | 57 |

This composition is prepared by blending an aqueous solution of gelatin with an aqueous alkaline dispersion of chloro-2-butadiene-1,3 polymer as previously described. After this composition has been applied to the glass it is allowed to dry. A sheet of pyroxylin (nitro-cellulose) or other suitable inner layer material is next placed between the two coated glass surfaces and the resulting sandwich is compressed and heated in the usual manner. A suitable pressure is 150 pounds per square inch at a temperature of 110° C., said pressure and temperature being maintained for five minutes. A sandwich prepared in this manner shows no bubbles on release of pressure, is perfectly transparent, and shows good resistance to impact tests. Moreover, the index of refraction of the gelatin-chloro-2-butadiene-1,3 polymer film is the same as that of pyroxylin with the result that any surface irregularities in the pyroxylin, such as sheeter lines, are masked by the adhesive film after the heat and pressure treatment. This feature permits the use of an unpolished pyroxylin sheet as the inner layer, with consequent elimination of any expensive polishing operation.

Numerous modifications of this process are possible. For example, the pyroxylin inner layer may be omitted and the protein-chloro-2-butadiene-1,3 polymer film may be used as a combined adhesive and inner layer. Furthermore the pyroxylin may be replaced by various esters or ethers of cellulose, such as cellulose acetate, benzyl cellulose, and ethyl cellulose, or by regenerated cellulose.

The use of protein-choro-2-butadiene-1,3 polymer compositions as a size for paper is illustrated by the following example:

*Example 6*

20 parts of glue is added to 80 parts of water at a temperature of 60-80° C. and the mixture is stirred until the glue has completely dissolved. 85 parts of a 47% aqueous alkaline dispersion of polymerized chloro-2-butadiene-1,3 containing 5 cc. of ammonia water (specific gravity 0.90) is added to 100 parts of the 20% glue solution, described above, and the mixture is stirred until completely blended. Alum or formaldehyde (2.5% based on the glue content of the size) may be added if desired to effect a hardening of the glue after application to the paper.

The paper to be sized is passed through a bath of glue-polymer dispersion after dilution with water to a 10% solids content. The excess size is removed from the paper by means of squeeze rolls. The sized paper, when dry, is pliable and oil-proof and shows greater resistance to the penetration of grease after creasing and folding than paper sized with glue alone.

The use of protein-chloro-2-butadiene-1,3 polymer compositions as a vehicle for cold water paints is illustrated by the following example:

*Example 7*

The following ingredients are ground in a ball mill for forty-eight hours to obtain a pigmented base:

*Mill base*

| | Parts |
|---|---|
| 16.6% casein dispersion (prepared as in Example 1) | 300 |
| Concentrated ammonia water (specific gravity 0.90) | 15 |
| Zinc oxide | 100 |
| | 415 |

This mill base is then blended with an aqueous dispersion of chloro-2-butadiene-1,3 polymer in the following proportions:

| | Parts |
|---|---|
| Mill base | 50 |
| Alkaline chloro-2-butadiene-1,3 polymer dispersion (47% solids) | 22 |
| 2% sodium silicate solution | 10 |
| | 82 |

Formaldehyde (2.5% based on casein) may be added if desired to effect an insolubilizing and hardening of the casein after application of the paint. The purpose of the sodium silicate is to precipitate soluble salts which may be present in the zinc oxide and which would tend to cause coagulation of the polymer dispersion unless removed. This cold water paint can be applied by spraying, brushing, etc., and dries to a tough, flexible film which is useful as a finish on beaver board, pressed board, leather, metal, glass, etc., and as a sealer or size coat on plaster. Other pigments may be incorporated to produce a variety of colors, and the ratio of ingredients may be varied to obtain variations in hardness, flexibility, etc. Other modifying agents in the form of aqueous dispersions in water may also be incorporated as, for example, dispersions of waxes, asphalts, synthetic and natural resins, drying oils, etc. Paints of this type are particularly useful where oil and grease resistance is desired.

The plasticizing properties of chloro-2-butadiene-1,3 polymer for protein materials may also be utilized in the preparation of plastics and molding materials, as for example, in the preparation of casein plastics. The preparation of a casein plastic containing chloro-2-butadiene-1,3 polymer is illustrated by the following example:

Example 8

100 parts of dry rennet casein is introduced into a steam heated kneading machine such as a Werner-Pfleiderer mixer. 300 parts of water containing 16.5 cc. of concentrated ammonia water (specific gravity 0.90) is added and the mass is kneaded until the casein is completely swollen. An aqueous alkaline dispersion of chloro-2-butadiene-1,3 polymer is then added, the total quantity added being 60 parts of a 42% dispersion. When the chloro-2-butadiene-1,3 polymer is thoroughly incorporated, steam is introduced through the mixer and heating is continued until the excess water is removed, or until the plastic contains about 15% moisture. The plastic mass may then be extruded in the form of rods, sheets, or tubes, or may be removed from the kneading machine and molded in a suitable die by means of pressure. A pressure of 2500 pounds per square inch and a temperature of 90° C., both maintained for a period of fifteen minutes are suitable for molding. The extruded or molded plastic is then placed in a bath of formaldehyde to harden the casein. Pigments may be incorporated during the kneading process, if desired, preferably in the form of a suspension of the pigment in dilute casein solution.

An alternative procedure for preparing plastics of this type consists in drying and powdering the kneaded plastic after removal from the mixer, followed by incorporation of a suitable hardening agent with the powdered material and molding in a die, under heat and pressure. Suitable hardening agents are resins which liberate formaldehyde at the molding temperature and thus harden the plastic in the mold. Dimethylol urea, condensation products of dimethylol urea with formaldehyde, or condensation products of diphenylol propane with formaldehyde have been found to be effective in this connection. Plastics prepared in this manner do not require further hardening in formaldehyde solution.

Plastics prepared as described above are less affected by moisture than casein plastics containing such water soluble plasticizing agents as glycerol, Turkey red oil, etc. They also show less shrinkage after the formaldehyde hardening process and can stand greater shock without shattering than similar casein plastics which contain no chloro-2-butadiene-1,3 polymer.

The plasticizing properties of chloro-2-butadiene-1,3 polymer for protein materials may be further utilized in the preparation of coated fabrics as, for example, in the preparation of gas-resistant fabrics (balloon fabric) and in the preparation of oil and grease resistant hose. Glue is often used as a coating composition for this purpose due to its impermeability to both gases and oils. Fabrics of this type are improved if polymerized chloro-2-butadiene-1,3 is incorporated with the glue since the polymer increases both the water resistance and pliability of the glue without effecting any sacrifice in its oil-resisting properties.

The term "aqueous dispersion of polymerized chloro-2-butadiene-1,3" (or "aqueous dispersion of chloro-2-butadiene-1,3 polymer") used throughout this specification applies to aqueous dispersions however prepared, and to the use of halogenated 1,3-butadienes other than chloro-2-butadiene-1,3 as, for example, bromo-2-butadiene-1,3. In general, it includes any of the aqueous dispersions disclosed in applicant's copending application, Serial No. 537,484, or in Kirby application, Serial No. 572,739, referred to above.

The term "protein" is intended to cover such materials as casein, gelatin, glue, blood and egg albumin, collagen, gluten, gliadin, etc., or mixtures of these materials in any proportions. Furthermore, we do not wish to be limited to any particular source or method of preparing the protein material. Dispersions of protein utilizing ammonia as the dispersing or swelling agent have been cited in the previous examples, especially in the case of casein dispersions. Instead of ammonia, however, other alkaline materials such as borax, trisodium phosphate, sodium carbonate, ammonium carbonate, caustic soda, etc., may be used to good advantage for this purpose.

While this invention is concerned primarily with the addition of the protein solution to the aqueous dispersion of polymerized chloro-2-butadiene-1,3, it is feasible to operate in the reverse manner especially in the case of acid media. It is possible, for example, to prepare the protein solution or dispersion, add chloro-2-butadiene-1,3 monomer, and then polymerize. This variation of the invention represents, however, a definitely less preferred embodiment because of the greatly decreased rate of polymerization of the chloro-2-butadiene-1,3.

The products prepared according to this invention are useful as adhesives for safety glass inner layers, as plastics and molding compositions, as vehicles for cold water paints, as laminating agents, as impregnating and coating compositions, as finishes for leather, and in other applications in which protein materials generally find use.

A film deposited from the composition described in Example 1, namely, the mixture of casein and chloro-2-butadiene-1,3 polymer, is tough, translucent, and flexible, and adheres well to practically all surfaces. A film deposited from the composition described in Example 3, namely the mixture of gelatin and chloro-2-butadiene-1,3 polymer, is perfectly transparent, is tough and flexible and adheres well to practically all surfaces. In other words, the addition of chloro-2-butadiene-1,3 polymer to protein films does not affect the natural transparency of the protein film. This is not true of natural rubber latex, which gives cloudy films with gelatin and casein. The transparency of the gelatin-chloro-2-butadiene-1,3 polymer film described under Example 3 makes it useful as a laminating agent for regenerated cellulose and as an adhesive for the pyroxylin inner layer of safety glass. The composition described under Example 1 can be utilized as a vehicle for cold water paints and in the sizing of paper, cardboard, etc., where unusual oil and grease resistance is desired.

Chloro-2-butadiene-1,3 polymer is an effective plasticizing agent for protein materials. This plasticizing effect is obtained without adversely affecting the transparency of the protein material in case it is utilized as a film. Furthermore, since chloro-2-butadiene-1,3 polymer is very resistant to water, it improves the water resistance of protein materials with which it is incorporated. This is not true of such commonly used protein softeners as glycerol, Turkey red oil, etc. In addition, the oil and grease resisting properties of protein materials are not adversely affected by the incorporation of chloro-2-butadiene-1,3 polymer, since the latter material has unusual oil and grease resistance.

The incorporation of protein materials in aqueous dispersions of chloro-2-butadiene-1,3 polymer results in a marked stabilization of the dispersions toward mechanical handling and toward precipitation by electrolytes. This enables modified chloro-2-butadiene-1,3 polymer dispersions to be sprayed, brushed, or spread without precipitation or the formation of lumps. The wetting properties of the modified chloro-2-butadiene-1,3 dispersions toward glass, fabric, paper, etc., are also greatly improved by the incorporation of protein materials. Finally, protein materials, due to their amphoteric properties act as acid acceptors and combine with the small amounts of acid sometimes liberated from the polymer under the influence of heat or light. This tends to stabilize compositions prepared from chloro-2-butadiene-1,3 polymer. Other advantages of the invention will be apparent from the above description and specific examples.

It is apparent that many widely different embodiments of this invention may be made without departing from the spirit and scope thereof, and therefore the invention is not to be limited except as indicated in the appended claims.

I claim:

1. An aqueous dispersion of a halogen-2-butadiene-1,3 and protein in which the ratio of one to the other is never greater than 9:1.

2. An aqueous dispersion of a halogen-2-butadiene-1,3 polymer and protein in which the ratio of one to the other is never greater than 9:1.

3. An aqueous dispersion of chloro-2-butadiene-1,3 and protein in which the ratio of one to the other is never greater than 9:1.

4. An aqueous dispersion of chloro-2-butadiene-1,3 polymer and protein in which the ratio of one to the other is never greater than 9:1.

5. An aqueous dispersion of chloro-2-butadiene-1,3 polymer and protein in which the ratio of one to the other is never greater than 9:1, to which has been added an emulsifying agent.

6. An aqueous dispersion of chloro-2-butadiene-1,3 polymer and protein in which the ratio of one to the other is never greater than 9:1, to which has been added a soap.

7. An aqueous alkaline dispersion of chloro-2-butadiene-1,3 polymer and protein in which the ratio of one to the other is never greater than 9:1.

8. An aqueous alkaline dispersion of chloro-2-butadiene-1,3 polymer and protein in which the ratio of one to the other is never greater than 9:1, to which has been added a fatty acid soap.

9. An aqueous dispersion comprising a chloro-2-butadiene-1,3 polymer and protein in which the ratio of one to the other is never greater than 9:1, obtained by polymerizing an emulsion of chloro-2-butadiene-1,3 and then adding the dispersion to a dispersion of the protein.

10. A plastic product containing a chloro-2-butadiene-1,3 polymer and protein in which the ratio of one to the other is never greater than 9:1.

11. An aqueous dispersion of a bromo-2-butadiene-1,3 polymer and protein in which the ratio of one to the other is never greater than 9:1.

12. An aqueous dispersion of a chloro-2-butadiene-1,3 polymer and glue in which the ratio of one to the other is never greater than 9:1.

13. An aqueous dispersion of a chloro-2-butadiene-1,3 polymer and gelatin in which the ratio of one to the other is never greater than 9:1.

14. An aqueous dispersion of a chloro-2-butadiene-1,3 polymer and casein in which the ratio of one to the other is never greater than 9:1.

15. An aqueous alkaline dispersion of a chloro-2-butadiene-1,3 polymer and casein in which the ratio of one to the other is never greater than 9:1.

16. An aqueous acid dispersion of a chloro-2-butadiene-1,3 polymer and casein in which the ratio of one to the other is never greater than 9:1, obtained by polymerizing chloro-2-butadiene-1,3 dispersed in an acid solution containing a small amount of casein, separately dispersing casein in an acid solution and then adding the casein dispersion to the polymerized chloro-2-butadiene-1,3.

17. A method of preparing aqueous alkaline dispersions of protein and chloro-2-butadiene-1,3 polymer which comprises emulsifying the chloro-2-butadiene-1,3 in water, polymerizing the emulsified chloro-2-butadiene-1,3 and adding an alkali, separately emulsifying the protein in an aqueous alkaline solution then adding the protein to the chloro-2-butadiene-1,3 and ageing the resulting dispersion.

18. A method of preparing aqueous alkaline dispersions of casein and chloro-2-butadiene-1,3 polymer which comprises emulsifying the chloro-2-butadiene-1,3 in water, polymerizing the emulsified chloro-2-butadiene-1,3 and adding an alkali, separately emulsifying the casein in an aqueous alkaline solution then adding the casein to the chloro-2-butadiene-1,3 and ageing the resulting dispersion.

19. The process of preparing an aqueous acid dispersion of chloro-2-butadiene-1,3 polymer and casein in which the ratio of one to the other is never greater than 9:1 which comprises dispersing the chloro-2-butadiene-1,3 in an aqueous acid solution to which has been added a small amount of casein, polymerizing the dispersed chloro-2-butadiene-1,3, separately dispersing the casein in an aqueous acid solution, then adding the casein dispersion to the chloro-2-butadiene-1,3 dispersion and ageing the resulting dispersion.

20. An aqueous acid dispersion of chloro-2-butadiene-1,3 polymer and protein in which the ratio of one to the other is never greater than 9:1.

21. A process of preparing aqueous dispersions of protein and chloro-2-butadiene-1,3 polymer which comprises emulsifying the chloro-2-butadiene-1,3 in water, polymerizing the emulsified chloro-2-butadiene-1,3 and then adding the polymerized chloro-2-butadiene-1,3 to an aqueous dispersion of the protein.

22. A process of preparing aqueous dispersions of protein and chloro-2-butadiene-1,3 which comprises adding an aqueous dispersion of protein to an aqueous dispersion of chloro-2-butadiene-1,3 and then polymerizing the dispersed chloro-2-butadiene-1,3.

ARNOLD M. COLLINS.